United States Patent [19]
Pelstring

[11] Patent Number: 6,104,570
[45] Date of Patent: Aug. 15, 2000

[54] DISC DRIVE SPINDLE MOTOR HAVING TUNED STATOR WITH ADHESIVE GROOVES

[75] Inventor: Robert M. Pelstring, Santa Cruz, Calif.

[73] Assignee: Seagate Technology, Inc., Scotts Valley, Calif.

[21] Appl. No.: 09/156,812

[22] Filed: Sep. 18, 1998

[51] Int. Cl.[7] .......................... G11B 17/02; H02K 15/02
[52] U.S. Cl. .................................. 360/98.07; 360/99.08
[58] Field of Search .............................. 360/97.01, 97.02, 360/98.07, 99.04, 99.08; 310/42, 51, 179, 194, 254

[56] References Cited

U.S. PATENT DOCUMENTS

| | | | |
|---|---|---|---|
| 1,688,891 | 10/1928 | Spreen | 310/51 |
| 3,438,407 | 4/1969 | Frohmuller et al. | 310/51 |
| 3,546,504 | 12/1970 | Janssen et al. | 310/51 |
| 4,268,233 | 5/1981 | Fernström | 418/270 |
| 4,456,882 | 6/1984 | Doty | 324/321 |
| 4,647,803 | 3/1987 | von der Heide et al. | 310/51 |
| 4,672,250 | 6/1987 | Seitz | 310/90 |
| 4,760,299 | 7/1988 | Dickie et al. | 310/91 |
| 4,823,034 | 4/1989 | Wrobel | 310/67 R |
| 4,935,080 | 6/1990 | Hassell et al. | 156/154 |
| 4,965,476 | 10/1990 | Lin | 310/51 |
| 5,041,935 | 8/1991 | Aruga et al. | 360/106 |
| 5,079,466 | 1/1992 | Jones | 310/91 |
| 5,097,366 | 3/1992 | Ueki et al. | 360/97.2 |
| 5,200,866 | 4/1993 | Frugè | 360/99.08 |
| 5,227,686 | 7/1993 | Ogawa | 310/90 |
| 5,235,227 | 8/1993 | Fazekas | 310/51 |
| 5,237,237 | 8/1993 | Ueda et al. | 310/323 |
| 5,241,229 | 8/1993 | Katakura et al. | 310/51 |
| 5,352,947 | 10/1994 | MacLeod | 360/99.08 |
| 5,367,418 | 11/1994 | Chessman et al. | 360/99.12 |
| 5,376,850 | 12/1994 | Elsing et al. | 310/67 |
| 5,430,589 | 7/1995 | Moir et al. | 360/97.02 |
| 5,457,588 | 10/1995 | Hattori et al. | 360/99.08 |
| 5,461,271 | 10/1995 | Asama et al. | 310/91 |
| 5,519,270 | 5/1996 | Yamada et al. | 310/67 R |
| 5,625,511 | 4/1997 | Brooks et al. | 360/99.08 |
| 5,774,974 | 7/1998 | Dunfield et al. | 29/596 |

FOREIGN PATENT DOCUMENTS

| | | |
|---|---|---|
| 770273 | 10/1967 | Canada . |
| 3-89838 | 4/1991 | Japan . |
| 4-168942 | 6/1992 | Japan . |
| 4-251542 | 9/1992 | Japan . |
| 4-364340 | 12/1992 | Japan . |
| 2 154 072 | 8/1985 | United Kingdom . |

*Primary Examiner*—Jefferson Evans
*Attorney, Agent, or Firm*—Westman, Champlin & Kelly, P.A.

[57] ABSTRACT

A disc drive spindle motor includes a central axis, a stationary member, a rotatable member which is rotatable with respect to the stationary member and a bearing interconnecting the rotatable member with the stationary member. A data storage disc is attached to the rotatable member. A stator is supported by the stationary member at an interface for rotating the rotatable member about the central axis with a driving force frequency. The stator has a resonant vibrational frequency. The interface has a plurality of recesses which are spaced axially from one another with respect to the central axis. An adhesive is applied within a selected set of the plurality of recesses and forms a bond between the stator and the stationary member. The set of recesses is selected such that the resonant vibrational frequency is different than the driving force frequency.

12 Claims, 5 Drawing Sheets

DISC DRIVE SPINDLE MOTOR HAVING TUNED STATOR WITH ADHESIVE GROOVES

BACKGROUND OF THE INVENTION

The present invention relates to disc drive spindle motors and, more particularly, to a spindle motor having a tuned stator resonant frequency.

Disc drive data storage devices, known as "Winchester" type disc drives, are well known in the industry. In a Winchester disc drive, digital data is written to and read from a thin layer magnetizable material on the surface of a rotating disc. Write and read operations are performed through a transducer which is carried on a slider body. The slider and the transducer are sometimes collectively referred to as a head, and typically a single head is associated with each disc surface. The heads are selectively moved under control of electronic circuitry to any one of a plurality of circular, concentric data tracks on the disc surface by an actuator device. In the current generation of disc drive products, the most commonly used type of actuator is a rotary moving coil actuator.

The discs are typically mounted in a "stack" on the hub structure of a brushless DC spindle motor. The rotational speed of the spindle motor is precisely controlled by motor drive circuitry which controls both the timing and the power of commutation pulses directed to the stator windings of the motor. Traditional spindle motor speeds have been in the range of 3,600 RPM. Current technology has increased spindle motor speeds to 10,000 RPM and above.

Analysis of the various types of disc drives has brought to light several different modes of acoustic noise generation which are attributable to the spindle motor and its control logic. One mode of noise generation is sympathetic vibration of the disc drive housing in response to the rotating mass of the spindle motor. Another mode of acoustic noise generation is electromagnetic disturbances caused by the excitation of the stator mass by the application and removal of the commutation pulses that are used to drive the motor and control its speed. The commutation pulses are timed, polarization-selected DC current pulses which are directed to sequentially selected stator windings. The rapid rise and fall times of these pulses act as a striking force and set up sympathetic vibrations in the stator structure. Interaction of resonant vibrational frequencies of the stator and its support structure with the fundamental forcing frequencies of the commutation pulses and their harmonics is a well known contributor to disc drive acoustic noise, and especially pure tone vibrations.

Several attempts have been made to tune the stator resonant frequency away from the fundamental forcing frequencies and their harmonics. For example, features have been machined into the spindle shaft of an in-hub spindle motor or into the stator mounting boss of an under-the-hub spindle motor. These "designed-in" machined features are effective at tuning the stator torsional resonant frequency, but cannot easily account for natural part variations associated with high volume manufacturing of spindle motor components such as shafts, stators and motor bases.

Improved methods of tuning the stator resonant vibrational frequency in high volume manufacturing processes are desired.

SUMMARY OF THE INVENTION

One aspect of the present invention relates to a method of mounting a stator, which has a resonant vibrational frequency, to a stationary member in a disc drive spindle motor. The method includes: providing a plurality of recesses in an interface between the stator and the stationary member; selecting a set of the plurality of recesses as a function of the resonant vibrational frequency; and placing an adhesive in the selected set of recesses to form a bond between the stator and the stationary member.

Another aspect of the present invention relates to a method of mounting the stator to the stationary member, which includes bonding the stator to the stationary member with a selected bond geometry such that the stator and the stationary member have a selected vibrational resonant frequency.

Another aspect of the present invention relates to a disc drive spindle motor. The spindle motor includes a central axis, a stationary member, a rotatable member which is rotatable with respect to the e stationary member and a bearing interconnecting the rotatable member with the stationary member. A data storage disc is attached to the rotatable member. A stator is supported by the stationary member at an interface. The stator rotates the rotatable member about the central axis with a driving force frequency and has a resonant vibrational frequency. The interface has a plurality of recesses which are spaced axially from one another with respect to the central axis. An adhesive is applied within a selected set of the plurality of recesses and forms a bond between the stator and the stationary member. The set of recesses is selected such that the resonant vibrational frequency is different than the driving force frequency.

DETAILED DESCRIPTION OF THE PREFERRED EMBODIMENTS

Figure 1:
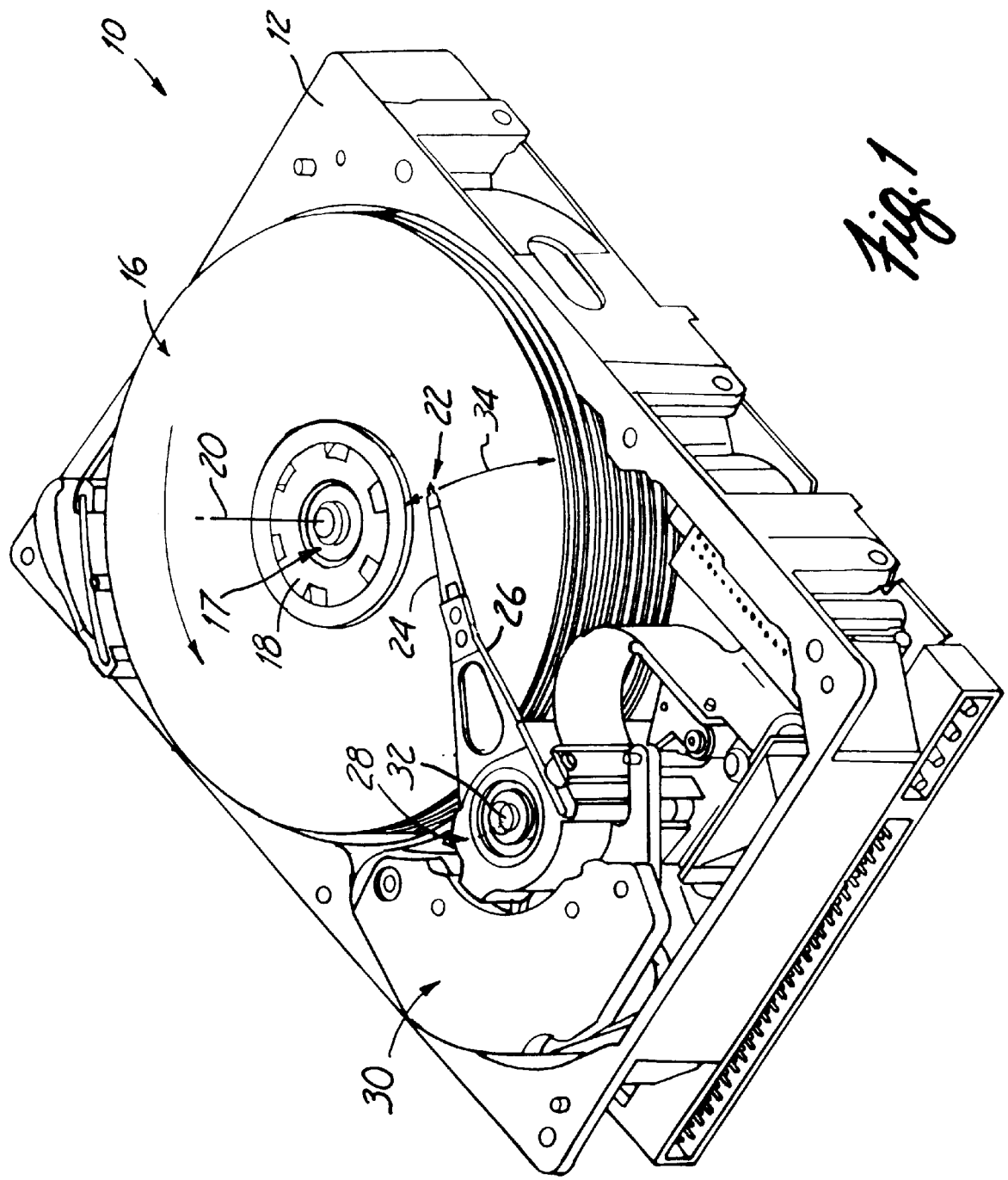
FIG. 1 is a perspective view of a disc drive data storage device, in accordance with one embodiment of the present invention.

The present invention is a disc drive data storage device having a spindle motor with selectively-filled adhesive grooves between the stator and its supporting member for tuning the torsional resonant frequency of the stator. FIG. 1 is a perspective view of a typical disc drive 10 in which the present invention is useful. Disc drive 10 includes a housing with a base 12 and a top cover (not shown). Disc drive 10 further includes a disc pack 16, which is mounted on a spindle motor 17 by a disc clamp 18. Disc pack 16 includes a plurality of individual discs which are mounted for co-rotation about a central axis 20. Each disc surface has an associated disc head slider 22 which is mounted to disc drive 10 for communication with the disc surface. In the example shown in FIG. 1, sliders 22 are supported by suspensions 24 which are in turn attached to track accessing arms 26 of an actuator 28. The actuator 28 shown in FIG. 1 is of the type known as a rotary moving coil actuator and includes a voice coil motor (VCM), shown generally at 30. Voice coil motor 30 rotates actuator 28 with its attached sliders 22 about a pivot shaft 32 to position sliders 22 over a desired data track along arcuate path 34.

Figure 2:
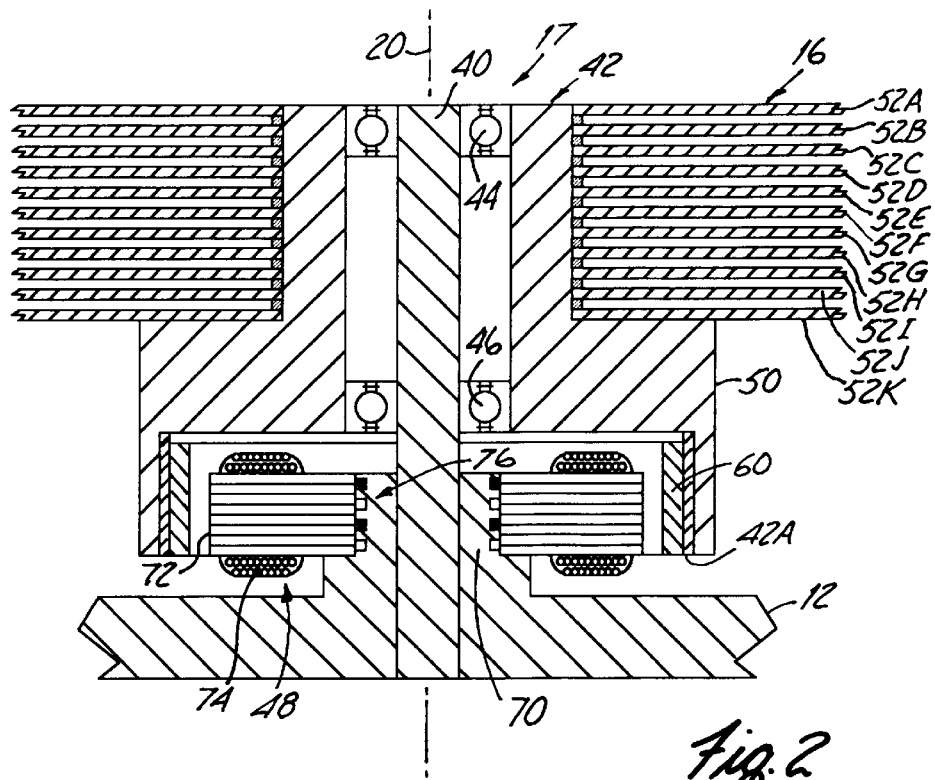
FIG. 2 is a sectional view of a spindle motor in the disc drive data storage device shown in FIG. 1.

FIG. 2 is a sectional view of spindle motor 17. Spindle motor 17 includes shaft 40, hub 42, bearings 44 and 46, and stator 48. In the embodiment shown in FIG. 2, shaft 40 is a non-rotating shaft which is fixed with respect to base 12. Shaft 40 defines central axis 20. Hub 42 is interconnected with shaft 40 through bearings 44 and 46 for rotation about shaft 40. Bearings 44 and 46 are ball bearing assemblies having inner races which are attached to the outer diameter of shaft 40 and outer races which are attached to the inner diameter of hub 42. Hub 42 includes a lower disc carrier member 50 which extends from the outer diameter of the hub for supporting disc pack 16. Disc pack 16 includes a plurality of individual discs 52A–52K. Disc pack 16 is held on disc carrier member 50 by disc clamp 18 (shown in FIG. 1).

Hub 42 carries a permanent magnet 60 on its inner diameter, which acts as a rotor for spindle motor 17. Rotor magnet 60 is magnetized to form one or more magnetic poles. Rotor magnet 60 can be formed as a unitary, annular ring, or can be formed of a plurality of individual magnets which are spaced about the inner circumference of hub 42. Hub 42 includes a back-iron 42A, which is formed of a magnetic material, for rotor magnet 60.

Stator 48 is supported by stationary member 70 which is in the form of a cylindrical mounting boss which extends vertically from base 12 along shaft 40. In an alternative embodiment, stator 48 is supported directly by shaft 40. Stator 48 includes a stator lamination 72 and a stator winding 74. Stator lamination 72 and stator winding 74 are spaced radially inward of rotor magnet 60 to allow rotor magnet 60 and hub 42 to rotate about central axis 20. Commutation pulses applied to stator winding 74 generate a rotating magnetic field which communicates with rotor magnet 60 and causes rotor magnet 60 and hub 42 to rotate about central axis 20 on bearings 44 and 46. The commutation pulses are timed, polarization-selected DC current pulses which are directed to sequentially selected stator windings to drive rotor magnet 60 and control its speed.

Stator 48 has various modes of vibration, such as torsional, rocking, flapping, axial and radial modes of vibration. The frequency of the commutation pulses applied to stator windings 74 is an excitor of these modes of vibration, and in particular torsional vibration. Interaction of the resonant vibrational frequency of stator 48 with the commutation pulse frequencies and their harmonics, contributes to disc drive acoustic noise and pure tone vibrations. Acoustic noise and pure tone vibrations are reduced with the present invention by modifying interface 76 between stator 48 and stationary member 70 to adjust the stator's resonant vibrational frequency, such as the resonant torsional frequency, away from the fundamental forcing frequencies and their harmonics.

Figure 3:
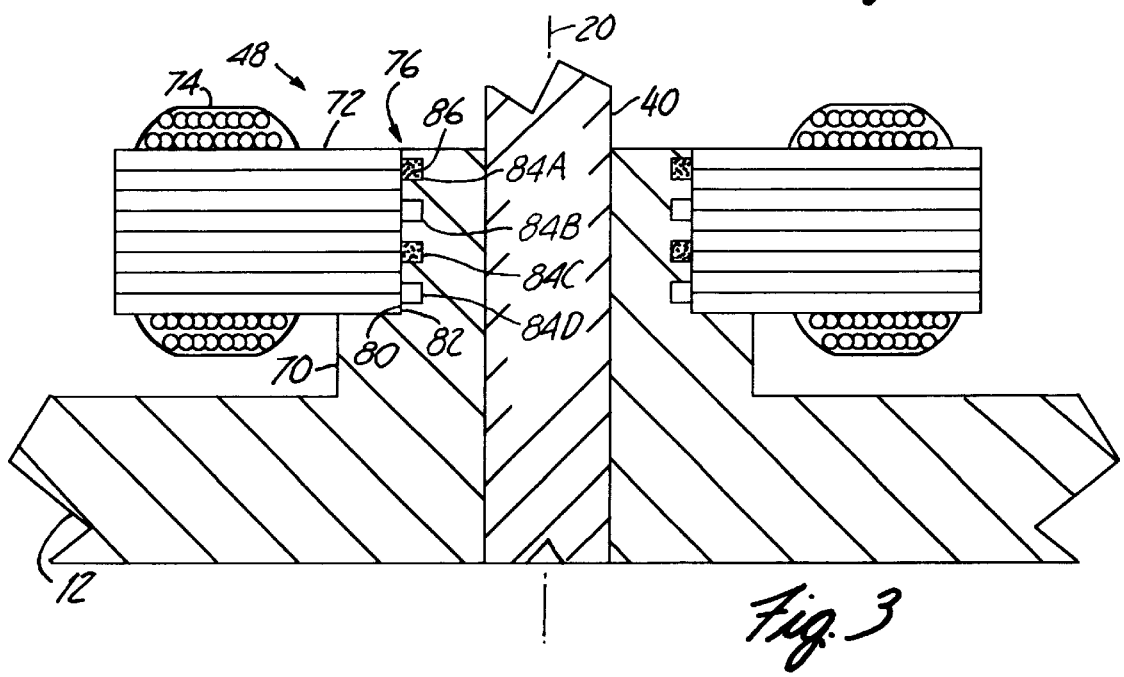
FIG. 3 is a sectional view of an interface between a stator and a stationary member in the spindle motor shown in FIG. 2.

Interface 76 is shown in greater detail in FIG. 3. Interface 76 is formed by inner diameter surface 80 of stator lamination 72 and outer diameter surface 82 of stationary member 70 and includes a plurality of circumferential grooves 84A–84D which are arranged perpendicular to central axis 20 and are spaced axially from one another along central axis 20. In the embodiment shown in FIGS. 2 and 3, grooves 84A–84D are machined into outer diameter surface 82 of stationary member 70. In another embodiment, grooves 84A–84D are machined into inner diameter surface 80 of stator lamination 72.

A selected set of the grooves 84A–74D, such as grooves 84A and 84C, are filled with an adhesive 86 to form a bond between stator 48 and stationary member 70. The remaining grooves 84B and 84D are left free of adhesive. For a particular one of the grooves 84A–84D to participate in the bond between stator 48 and stationary member 70, the groove must be filled with an adhesive. The grooves that are filled with an adhesive are selected as a function of the stator's resonant vibrational frequency, such as the torsional resonant frequency, to move the resonant frequency away from the driving force frequencies of the commutation pulses that are applied to the stator and their harmonics. Varying the selection of grooves varies the spacing and number of the bonds between stator 48 and stationary member 70, which varies the stiffness of the stationary member as a spring relative to the various modes of vibration. By varying the selection of grooves that are filled with adhesive, the stator's resonant vibrational frequency can be tuned away from the driving force frequencies and their harmonics.

In a high volume manufacturing process, each disc drive is manufactured with the same grooves. Normal variations in the tolerances of individual parts within each disc drive may result in variations in the resonant vibrational frequency of each disc drive or each manufacturing lot of disc drives. These resonant vibrational frequencies can be tuned away from the driving force frequencies on a drive-by-drive basis or lot-by-lot basis by selecting the grooves to be filled with adhesive without changing the design or geometry of individual parts in the disc drive.

Figure 4:
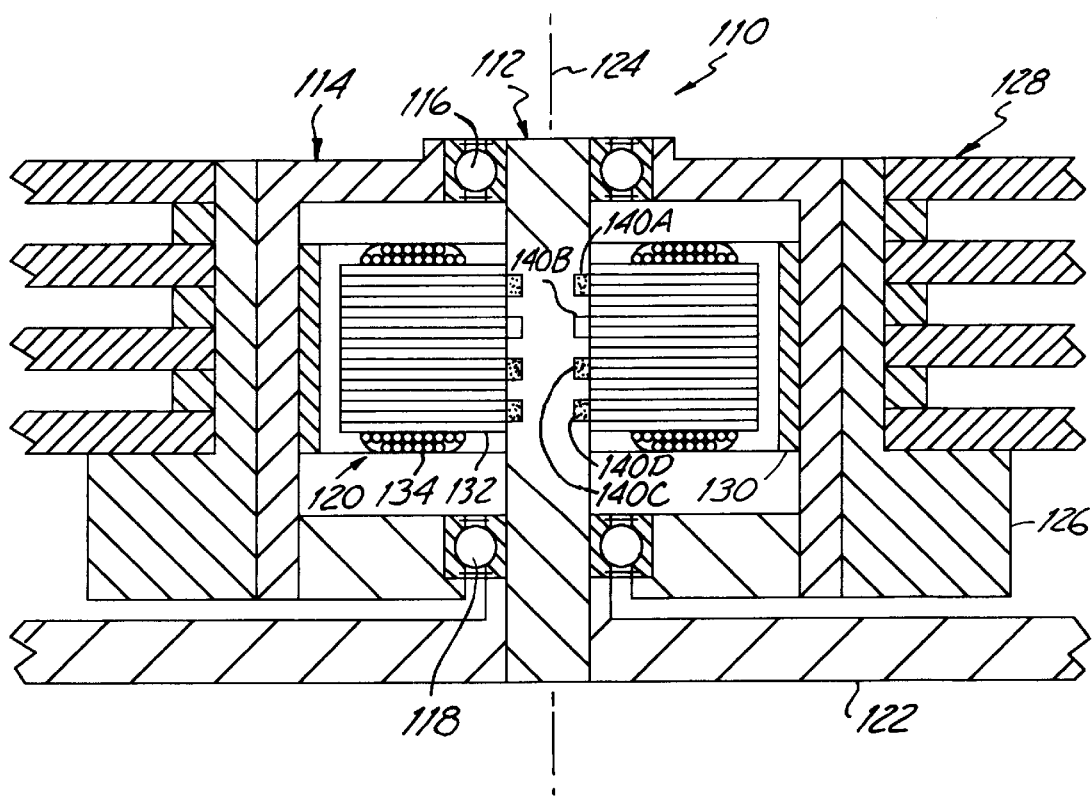
FIG. 4 is a sectional view of a spindle motor having an "in-hub", fixed shaft configuration, according to an alternative embodiment of the present invention.

FIG. 4 is a sectional view of a spindle motor 110 having a fixed-shaft, "in-hub" stator configuration. Spindle motor 110 includes fixed shaft 112, hub 114, bearings 116 and 118 and stator 120. Shaft 112 is supported by and extends from housing base 122 and defines a central axis 124. Hub 114 is interconnected with shaft 112 through bearings 116 and 118. Hub 114 includes disc carrier member 126 for supporting disc pack 128. Magnet 130 is attached to the inner diameter of hub 114 and acts as a rotor for spindle motor 110.

Stator 120 is attached to the outer diameter of shaft 112 and is positioned within an internal cavity of hub 114, between bearings 116 and 118. Shaft 112 acts as a stationary member for supporting stator 120. Stator 120 includes stator laminations 132 and stator windings 134.

A plurality of grooves 140A, 140B, 140C and 14D are machined into the outer diameter surface of shaft 112, along the inner diameter of stator laminations 132. Grooves 140A–140D are selectively filled with adhesive 150 as a function of the resonant vibrational frequency of stator 120 for forming a bond between shaft 112 and stator 120 and for tuning the resonant vibrational frequency away from the stator driving frequencies, according to the present invention.

Figure 5:
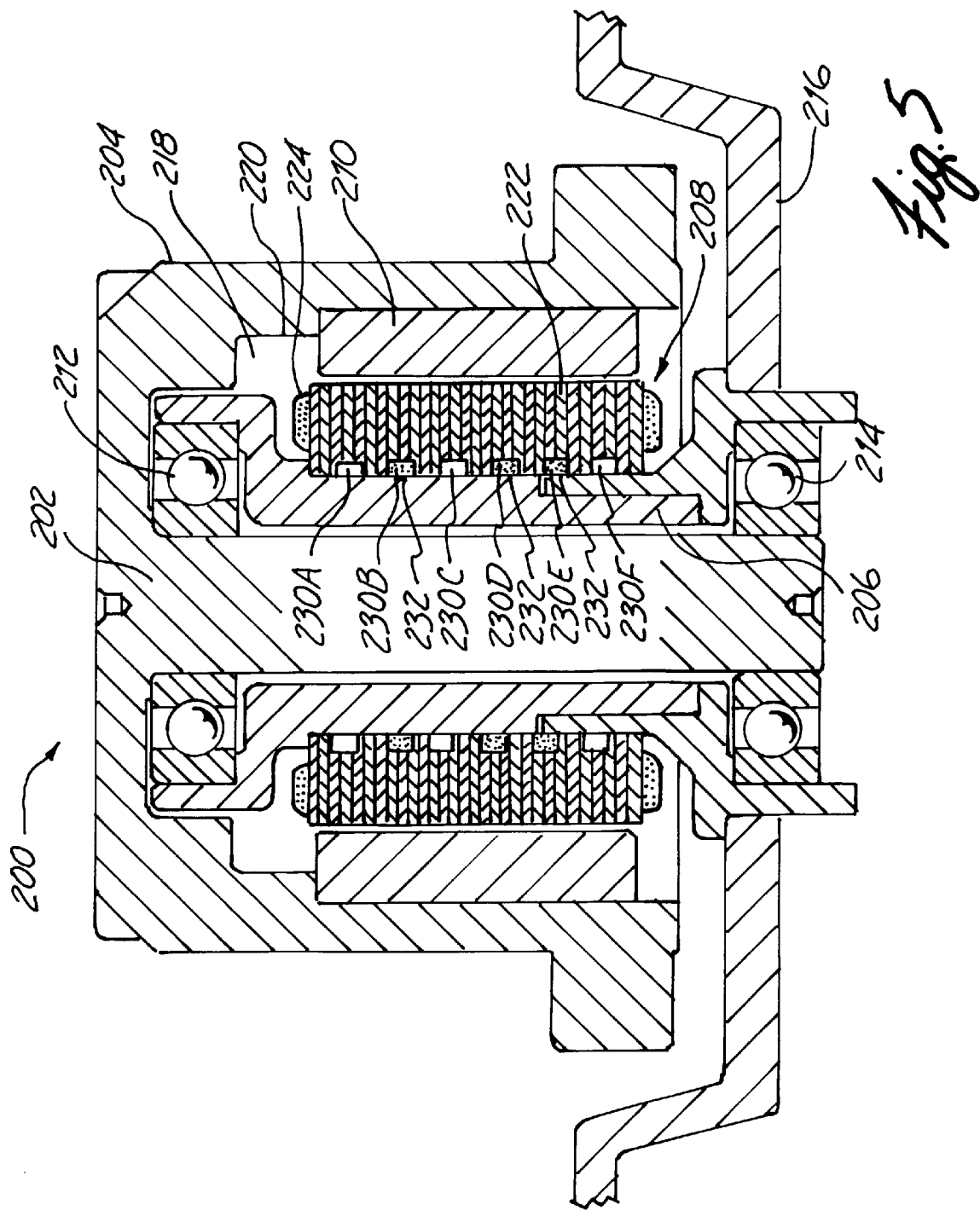
FIG. 5 is a sectional view of a disc drive spindle motor having an in-hub, rotating shaft configuration, according to another alternative embodiment of the present invention.

FIG. 5 is a sectional view of a disc drive spindle motor 200 having an in-hub, rotating shaft configuration, according to another alternative embodiment of the present invention. Spindle motor 200 includes rotating shaft 202, hub 204, stationary sleeve 206 and stator 208. Hub 204 is supported by rotating shaft 202 and supports a magnet 210 at an inner diameter 220. Stationary sleeve 206 is supported by base 216 and is interconnected with rotating shaft 202 through bearings 212 and 214. Stator 208 includes stator laminations 222 and stator windings 224. The inner diameter of stator laminations 222 is supported by the outer diameter of stationary sleeve 206.

In the embodiment shown in FIG. 5, grooves 230A–230F are machined into the inner diameter surface of stator laminations 222 at the interface with stationary sleeve 206. Grooves 230A–230F are selectively filled with an adhesive 232 for adjusting the stator's resonant vibrational frequency to a selected resonant vibrational frequency, as discussed above.

Figures 6, 7:
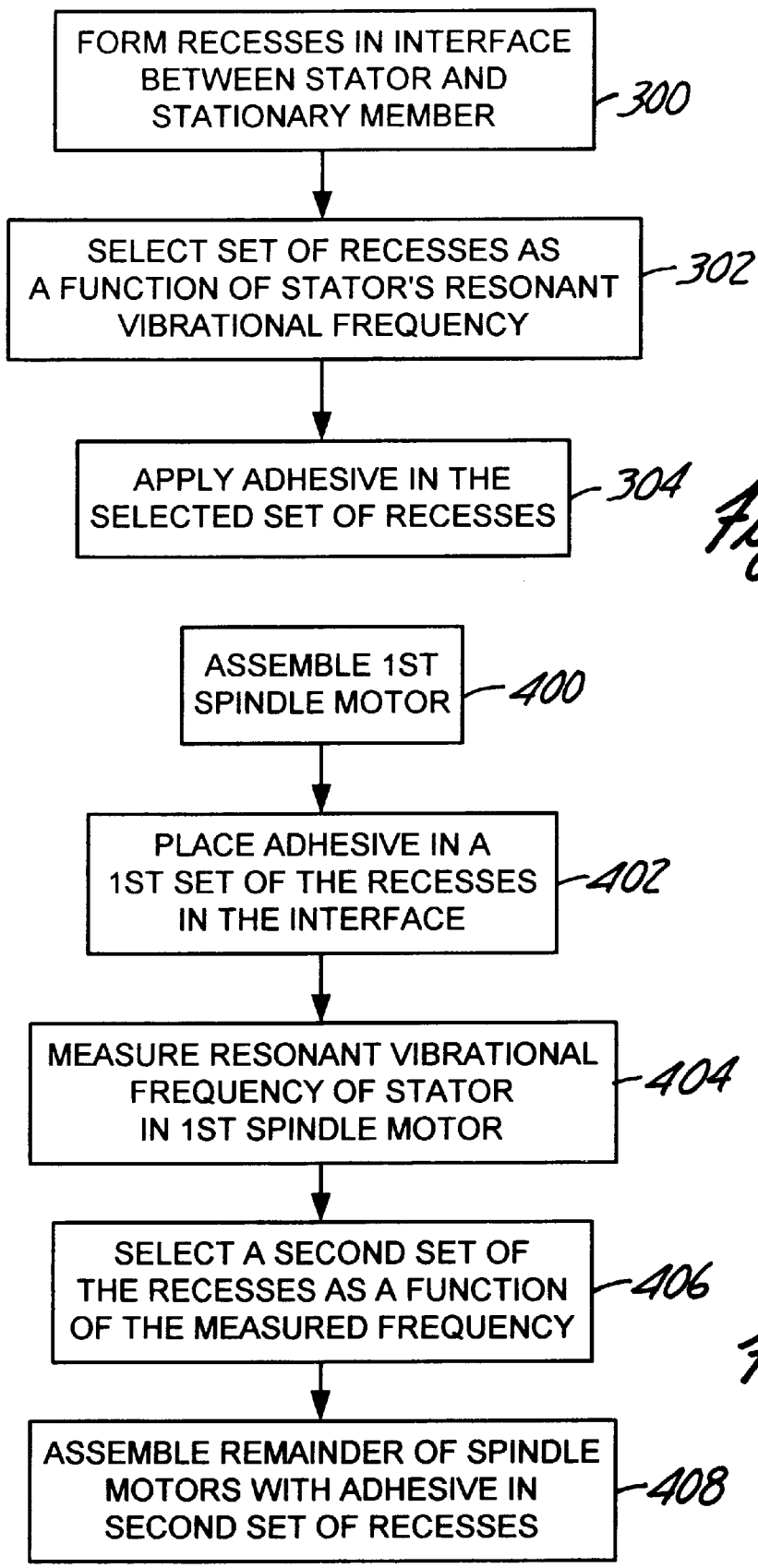
FIG. 6 is a flow chart of a method of mounting a stator to a stationary member in a disc drive spindle motor according to one embodiment of the present invention.
FIG. 7 is a flow chart of a method of tuning the stator resonant vibrational frequency in a high volume manufacturing process.

FIG. 6 is a flow chart of a method of mounting a stator to a stationary member in a disc drive spindle motor according to one embodiment of the present invention. At step 300, a plurality of recesses are formed in the interface between the stator and the stationary member. The recesses can be formed in the stator, the stationary member or both the stator and the stationary member. The recesses can have a variety of shapes, such as a plurality circumferential, annular grooves or spaced depressions which can be arranged in a variety of geometries. At step 302, a set of the plurality of recesses are selected as a function of the resonant vibrational frequency of the stator. At step 304, an adhesive is placed in the selected set of recesses to form a bond between the stator and the stationary member.

FIG. 7 is a flow chart of a method of tuning the stator resonant vibrational frequency in a high volume manufacturing process. At step 400, a first of a plurality of spindle motors is assembled from a given lot of manufacturing parts. Each spindle motor has a stator which is supported by a stationary member at an interface having a plurality of adhesive recesses. The geometric pattern of the plurality of recesses is the same in each spindle motor. At step 402, an adhesive is placed in a selected first set of the plurality of recesses in the first spindle motor to form a bond between the stator and the stationary member. At step 404, the resonant vibrational frequency of the stator in the first spindle motor is measured. The resonant vibrational frequency can be measured by exciting the stator windings of the assembled motor with white noise or a sinusoidal sweep of commutation frequencies to induce vibration in the stator. The frequency response of the stator vibration can then measured over a broad range of excitation frequencies with accelerometers, laser-based sensors, or other non-contact displacement probes, for example. The resonant vibrational frequency of the stator is determined from the measured frequency response and compared with the expected driving force frequencies of the stator and their harmonics.

At step 406, a second set of the plurality of recesses is selected as a function of the measured vibrational frequency. The second set of recesses is selected such that the resonant vibrational frequency is different than the driving force frequencies of the stator and their harmonics. The remainder of the spindle motors of the given manufacturing lot are then assembled, at step 408, with adhesive being placed in the second set of recesses.

Although the present invention has been described with reference to preferred embodiments, workers skilled in the art will recognize that changes may be made in form and detail without departing from the spirit and scope of the invention. For example, the adhesive grooves can have various configurations. The spindle motor can have a fixed shaft or a rotating shaft. The stator can be positioned at various locations along the central axis, such as within the hub or below the hub. The stator can have a radial position which is either internal to the hub or external to the hub. The bearing between the stationary member and the hub be a ball bearing assembly or a hydrodynamic bearing assembly.

What is claimed is:

1. A method of mounting a stator to a stationary member in a disc drive spindle motor, wherein the stator and stationary member have a resonant vibrational frequency, the method comprising:

providing a plurality of recesses in an interface between the stator and the stationary member;

selecting a set of the plurality of recesses as a function of the resonant vibrational frequency; and placing an adhesive in the selected set of recesses to form a bond between the stator and the stationary member.

2. The method of claim 1 wherein placing an adhesive comprises placing an adhesive in less than all of the plurality of recesses.

3. The method of claim 1 wherein providing a plurality of recesses in the interface comprises forming the plurality of recesses in a surface of the stationary member.

4. The method of claim 1 wherein providing a plurality of recesses in the interface comprises forming the plurality of recesses in a surface of the stator.

5. The method of claim 1 wherein providing a plurality of recesses in the interface comprises machining a plurality of circumferential grooves in the interface which are coaxial with a central axis of the spindle motor and spaced axially from one another along the central axis.

6. The method of claim 1 wherein the stator has a driving force frequency and wherein selecting a set of the plurality of recesses comprises selecting the recesses in which the adhesive is placed such that the resonant vibrational frequency is different than the driving force frequency and its harmonics.

7. A method of tuning a stator resonant vibrational frequency in a plurality of disc drive spindle motors, wherein each spindle motor has a stator which is supported by a stationary member at an interface having a plurality of adhesive recesses, and wherein the geometric pattern of the plurality of recesses is the same in the plurality of spindle motors, the method comprising:

placing adhesive in a selected first set of the plurality of recesses in a first of the plurality of spindle motors to form a bond between the stator and the stationary member in the first spindle motor;

measuring a resonant vibrational frequency of the stator in the first spindle motor;

selecting a second set of the plurality of recesses as a function of the measured vibrational frequency; and placing adhesive in the second set of recesses in a second of the plurality of spindle motors to form a bond between the stator and the stationary member in the second spindle motor.

8. A disc drive spindle motor comprising:

a central axis;

a stationary member;

a rotatable member which is rotatable with respect to the stationary member;

a bearing interconnecting the rotatable member with the stationary member;

a data storage disc attached to the rotatable member;

a stator supported by the stationary member at an interface for rotating the rotatable member about the central axis with a driving force frequency, wherein the interface has a plurality of recesses which are spaced axially from one another with respect to the central axis and wherein the stator has a resonant vibrational frequency; and an adhesive applied within a selected set of the plurality of recesses and forms a bond between the stator and the stationary member, wherein the set of recesses is selected such that the resonant vibrational frequency is different than the driving force frequency.

9. The disc drive spindle motor of claim 8 wherein the adhesive is positioned in less than all of the plurality of recesses.

10. The disc drive spindle motor of claim 8 wherein the interface is formed by a surface of the stator and an opposing surface of the stationary member and wherein the recesses are formed in the surface of the stationary member.

11. The disc drive spindle motor of claim 8 wherein the interface is formed by a surface of the stator and an opposing surface of the stationary member and wherein the recesses are formed in the surface of the stator.

12. The disc drive spindle motor of claim 8 wherein each of the plurality of recesses comprises a circumferential groove which is coaxial with the central axis.

* * * * *